(12) United States Patent
Dhariwal et al.

(10) Patent No.: US 12,434,266 B2
(45) Date of Patent: Oct. 7, 2025

(54) ANTI-COUNTERFEIT ENVIRONMENT-FRIENDLY PACKAGING MATERIAL

(71) Applicant: CREATIVE PLASTICS, Pune (IN)

(72) Inventors: Prakash Rasiklal Dhariwal, Pune (IN); Milind Ganesh Bhole, Pune (IN); Sharad Shrikant Kulkarni, Pune (IN)

(73) Assignee: CREATIVE PLASTICS, Pune (IN)

( * ) Notice: Subject to any disclaimer, the term of this patent is extended or adjusted under 35 U.S.C. 154(b) by 896 days.

(21) Appl. No.: 16/635,760

(22) Filed: Jan. 31, 2020

(65) Prior Publication Data

US 2023/0031043 A1 Feb. 2, 2023

(51) Int. Cl.
| | | |
|---|---|---|
| *B65D 33/00* | (2006.01) | |
| *B05D 3/10* | (2006.01) | |
| *B42D 25/30* | (2014.01) | |
| *B42D 25/328* | (2014.01) | |
| *B65D 30/08* | (2006.01) | |
| *B65D 33/25* | (2006.01) | |
| *B65D 65/42* | (2006.01) | |

(Continued)

(52) U.S. Cl.
CPC .............. *B05D 3/101* (2013.01); *B05D 3/108* (2013.01); *B42D 25/30* (2014.10); *B42D 25/328* (2014.10); *B65D 31/02* (2013.01); *B65D 33/004* (2013.01); *B65D 33/2508* (2013.01); *B65D 33/259* (2020.05); *B65D 65/42* (2013.01); *B65D 65/466* (2013.01)

(58) Field of Classification Search
CPC ............ B65D 33/25; B65D 33/2508; B65D 33/2516; B65D 33/2525; B65D 33/2533; B65D 33/2541; B65D 33/255; B65D 33/2558; B65D 33/2566; B65D 33/2575; B65D 33/2583; B65D 33/2584; B65D 33/2585; B65D 33/2586; B65D 33/25865; B65D 33/2587; B65D 33/2588; B65D 33/2589; B65D 33/259; B65D 33/2591; G02B 30/20; G02B 30/22; G02B 30/27; G02B 30/40
USPC ..................... 383/61.1, 63, 64, 65
See application file for complete search history.

(56) References Cited

U.S. PATENT DOCUMENTS 5,947,603 A * 9/1999 Tilman ............... B65D 33/2541
160/124
2002/0150775 A1* 10/2002 Ishikawa ................ B44C 1/105
428/458

(Continued)

FOREIGN PATENT DOCUMENTS

CN 202134159 U 2/2012
WO 2011064794 A2 6/2011

*Primary Examiner* — Nathan J Newhouse
*Assistant Examiner* — Nina K Attel
(74) *Attorney, Agent, or Firm* — Gottlieb, Rackman & Reisman, PC (57) ABSTRACT

The present disclosure discloses an anti-counterfeit environment-friendly packaging material. The packaging material comprises an environment-friendly multilayer polymeric composite; and at least one iridescent non-metallic holographic stereogram in or on at least one layer of said environment-friendly multilayer polymeric composite. Also disclosed is a process for preparing an anti-counterfeit environment-friendly packaging material. The present disclosure further provides an anti-counterfeit reclosable package comprising the environment-friendly multilayer polymeric composite.

13 Claims, 6 Drawing Sheets

(51) Int. Cl.
*B65D 65/46* (2006.01)
*G03H 1/26* (2006.01)

(56) References Cited

U.S. PATENT DOCUMENTS

| | | | | |
|---|---|---|---|---|
| 2003/0029548 A1* | 2/2003 | Weder | ............... | G03H 1/028 156/196 |
| 2006/0286373 A1* | 12/2006 | Egawa | ............... | C08L 67/04 428/339 |
| 2014/0153818 A1* | 6/2014 | Lanfranchi | ............ | G02B 30/27 382/154 |
| 2014/0349045 A1* | 11/2014 | Cloutier | ............ | B32B 37/12 428/335 |
| 2015/0353238 A1* | 12/2015 | Moehlenbrock | ....... | B65D 31/10 493/267 |

* cited by examiner

ANTI-COUNTERFEIT ENVIRONMENT-FRIENDLY PACKAGING MATERIAL

CROSS-REFERENCE TO RELATED APPLICATIONS

This application is the United States National Stage entry under 35 U.S.C. 371 of PCT/IB2018/055718, filed Jul. 31, 2018, which in turn claims the priority of Indian Patent Application number 201721027359, filed Aug. 1, 2017, the contents of each of which are hereby incorporated by reference in their entirety.

FIELD

The present disclosure relates to packaging systems, particularly, food, tobacco and pharmaceutical grade packaging systems.

Definitions

As used in the present disclosure, the following terms are generally intended to have the meaning as set forth below, except to the extent that the context in which they are used indicate otherwise.

Biodegradability: Biodegradability refers to the ability of materials to completely break down and decompose into natural elements by biological means. These materials can be solids biodegrading into the soil or liquids biodegrading into water. A biodegradable polymer is intended to break up in the presence of microorganisms.

Compostability: Compostability refers to the ability of materials to break down to nutrient rich mass (humus) in a short span of time when provided with composting conditions.

Multilayer polymeric composite: Multilayer polymeric composite comprises a biodegradable and compostable multilayer first substrate; and a second substrate comprising at least one layer selected from metal and/or metallized layer and a paper and/or pretreated paper layer. Further, multilayer first substrate comprises an inner layer, an outer layer and a core layer disposed between the inner layer and the outer layer. Further, the inner layer, the outer layer and the core layer independently comprises at least one blend of polylactic acid and a copolyester of 1,4-butanediol, adipic acid, and terephthalic acid.

Reclosable packaging systems: Reclosable packaging system, in the present disclosure, refers to flexible packaging systems and rigid packaging systems. Flexible packaging systems are mostly of intermeshing, zipper or non-zipper type, which can be sealed and opened multiple number of times by manually pressing across the non-zipper male-female type interlocking closure members (in case of intermeshing type packaging systems), or using a slider element (in case of zipper packaging systems) or by manually pressing across the male and female closure members (in case of non-zipper packaging systems). Rigid packaging systems would consist of packaging systems like cartons (which have a threaded cap type closure mechanisms), and collapsible containers.

Reclosable closures: Reclosable closures are closures employed in reclosable packaging systems. They may be of intermeshing type, slider-type or male-female type (in case of flexible packaging systems) or threaded caps or lids (in case of rigid packaging systems).

Intermeshing type closure: In the present disclosure, intermeshing type closures are closures in which the mating members are not of male-female type, instead are designed in such a way as to achieve interlocking with members identical to each other.

BACKGROUND

The background information herein below relates to the present disclosure but is not necessarily prior art.

Biodegradable polymeric films are slowly catching up as a promising substitute to conventional naphtha based non-biodegradable polymers. They are readily degradable in soil and water without producing any harmful waste.

A few biodegradable resins like polylactic acid, modified starches and polyhydroxyalkanoates are successfully made into films. However, such films have not been successfully made into usable packaging systems, particularly, for use in the packaging of tobacco based products and packaging in pharmaceutical and food industry. Further, these films have been found to be completely incompatible and non-resistant to the corrosive ingredients in medicines, acidic food products and tobacco based products.

Also, there is an ever increasing need for better anti-counterfeiting techniques to be employed on packaging systems. The conventional anti-counterfeiting techniques requiring metalized films are cumbersome and the metalized holograms also are not aesthetic in their appeal.

There is, thus, felt a need for an anti-counterfeit packaging system that is, environment-friendly, yet exhibits excellent mechanical properties and high compatibility towards corrosive ingredients and the ability to be made use of, particularly, in the packaging of tobacco based products, and also, in the pharmaceutical and food industry.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide an anti-counterfeit environment-friendly packaging material with enhancement of aesthetics.

Another object of the present disclosure is to provide an anti-counterfeit environment-friendly packaging material that is non-reactive with the contents of the package and is useful for packaging of tobacco based products, pharmaceutical and food products.

Other objects and advantages of the present disclosure will be more apparent from the following description, which is not intended to limit the scope of the present disclosure.

SUMMARY

The present disclosure provides an anti-counterfeit environment-friendly packaging material. The packaging material comprises an environment-friendly multilayer polymeric composite; and at least one iridescent non-metallic holographic stereogram in or on at least one layer of said environment-friendly multilayer polymeric composite, wherein the holographic stereogram is prepositional.

The holographic stereogram comprises one or more iridescent patterns selected from the group consisting of images, geometrical shapes, non-geometrical shapes and the like.

The present application further provides a process for preparing anti-counterfeit environment-friendly packaging material. The process comprises following steps.

Initially, the polymeric composite is coated with a primer to obtain primered polymeric composite. The primered polymeric composite is optionally subjected to corona treatment.

Pre-positioned UV base coat is then applied on to the primered polymeric composite, followed by curing to obtain UV base coated polymeric composite.

The so obtained UV base coated polymeric composite is contacted with transfer film having iridescent non-metallic pre-created holographic stereogram to obtain anti-counterfeit environment-friendly packaging material; wherein the iridescent non-metallic holographic stereogram is applied at pre-positioned locations.

The present disclosure also provides a package (10) comprising:
i. a first wall (128, 28, 60) and a second wall (130, 30 62), wherein said first wall (128, 28, 60) and said second wall (130, 30 62) are partially joined to each other along their edges to define an inner space within said walls and provide an opening along the edge defining a mouth for introducing or removing material into and from said inner space; and
ii. a closure element (120, 20, 54);
wherein, at least one of said walls comprises:
a. an environment-friendly polymeric composite; and
b. at least one iridescent non-metallic holographic stereogram in or on at least one layer of said environment-friendly polymeric composite.

Figure 1:
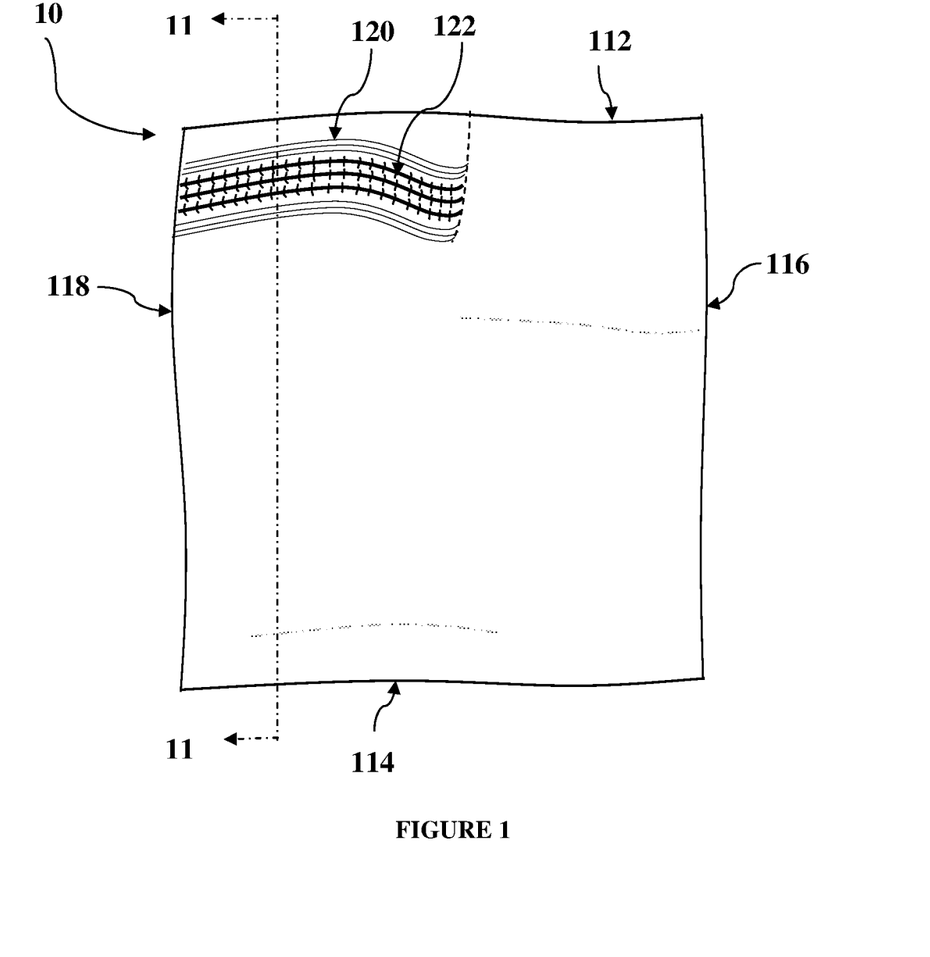
FIG. 1 illustrates a front view of an anti-counterfeit intermeshing type environment-friendly reclosable packaging system in a closed condition constructed in accordance with one embodiment of the present disclosure.
Figure 2:
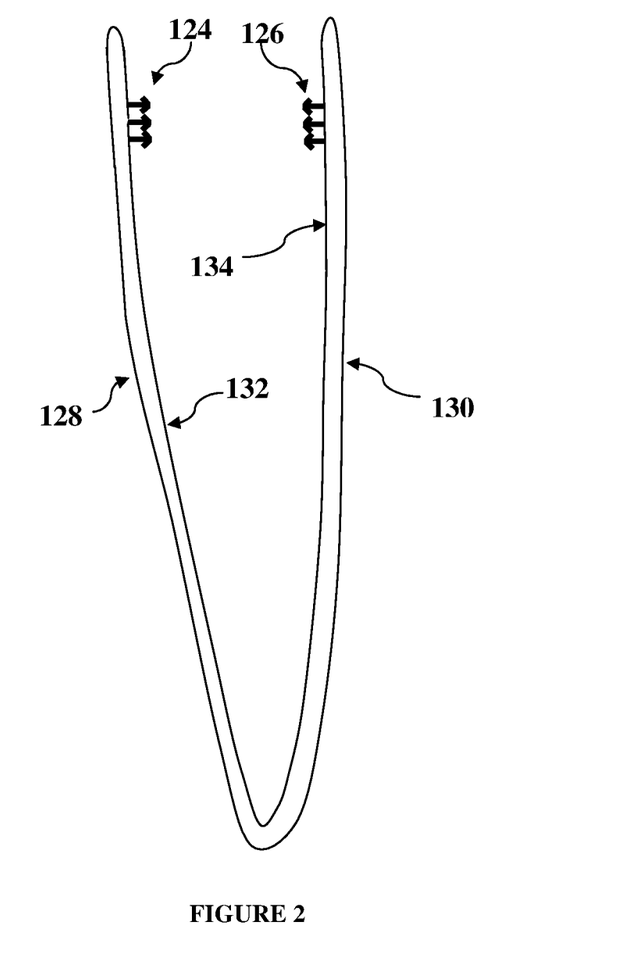
FIG. 2 illustrates a sectional view of the anti-counterfeit intermeshing type environment-friendly reclosable packaging system of FIG. 1 taken along line 11-11 of FIG. 1, with the closure in an open condition.

In one embodiment, the closure element (120) comprises a first member strip (126) attached in proximity to the operative top edge (112) of said second wall (130) on operative inner surface (134) of said second wall (130) and a second member strip (124) secured in proximity to the operative top edge of said first wall (128) on operative inner surface (132) of said first wall (128). The first member strip (126) and the second member strip (124) comprise a plurality of interlocking structures (122). Further, each interlocking structure (122) comprises a plurality of inverted anchor type elements uprightly disposed on said first member strip (126) and said second member strip (124) and connected to each other via a plurality of bridges.

Figure 3:
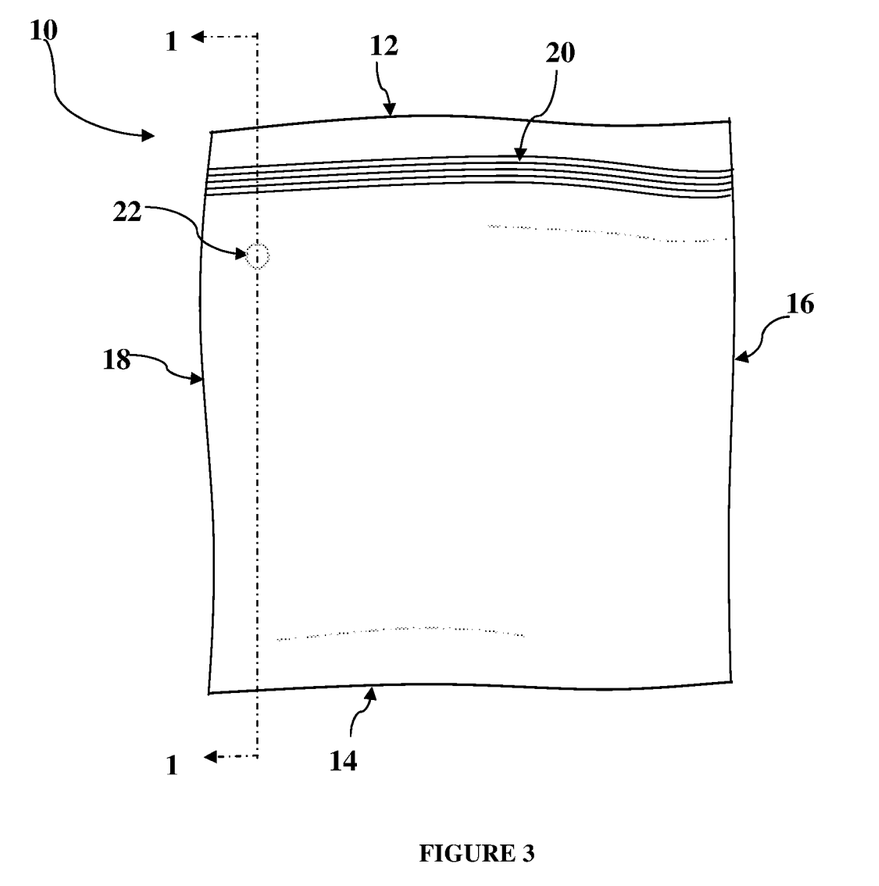
FIG. 3 illustrates a front view of an anti-counterfeit non-zipper type environment-friendly reclosable packaging system in a closed condition constructed in accordance with another embodiment of the present disclosure.
Figure 4:
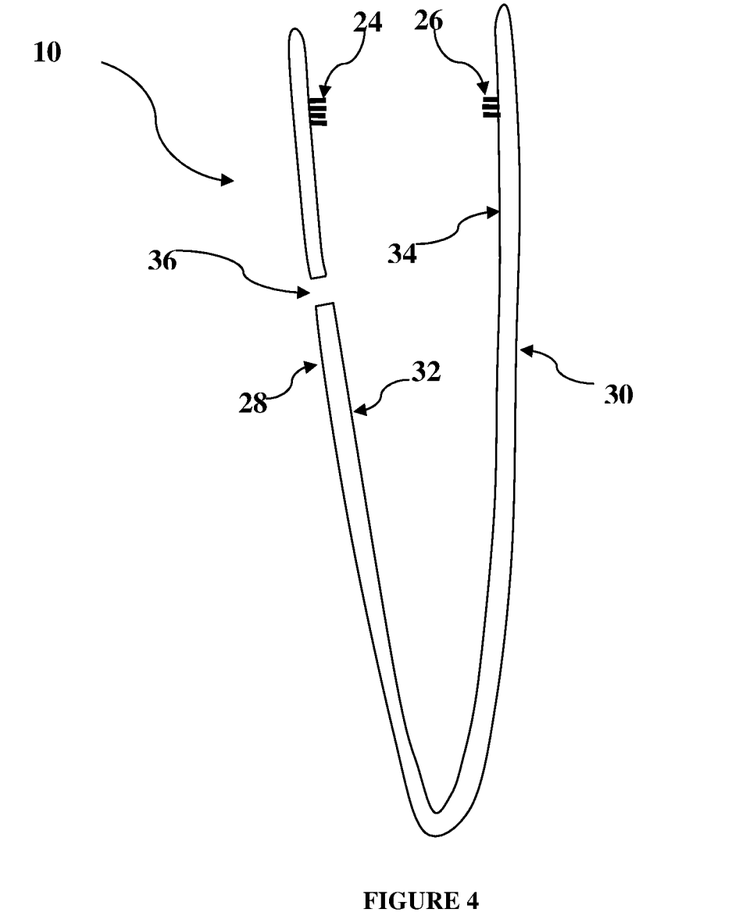
FIG. 4 illustrates a sectional view of the anti-counterfeit non-zipper type environment-friendly reclosable packaging system of FIG. 3 taken along line 1-1 of FIG. 3, with the closure in an open condition.

In another embodiment, the closure element (20) comprises a male member strip (26) comprising at least one rib secured on the operative top edge of the second wall (30) on operative inner surface (34) of said second wall (30); and a female member strip (24) comprising at least one groove secured on the operative top edge of the first wall (28) on operative inner surface (32) of said first wall (28).

Figure 5:
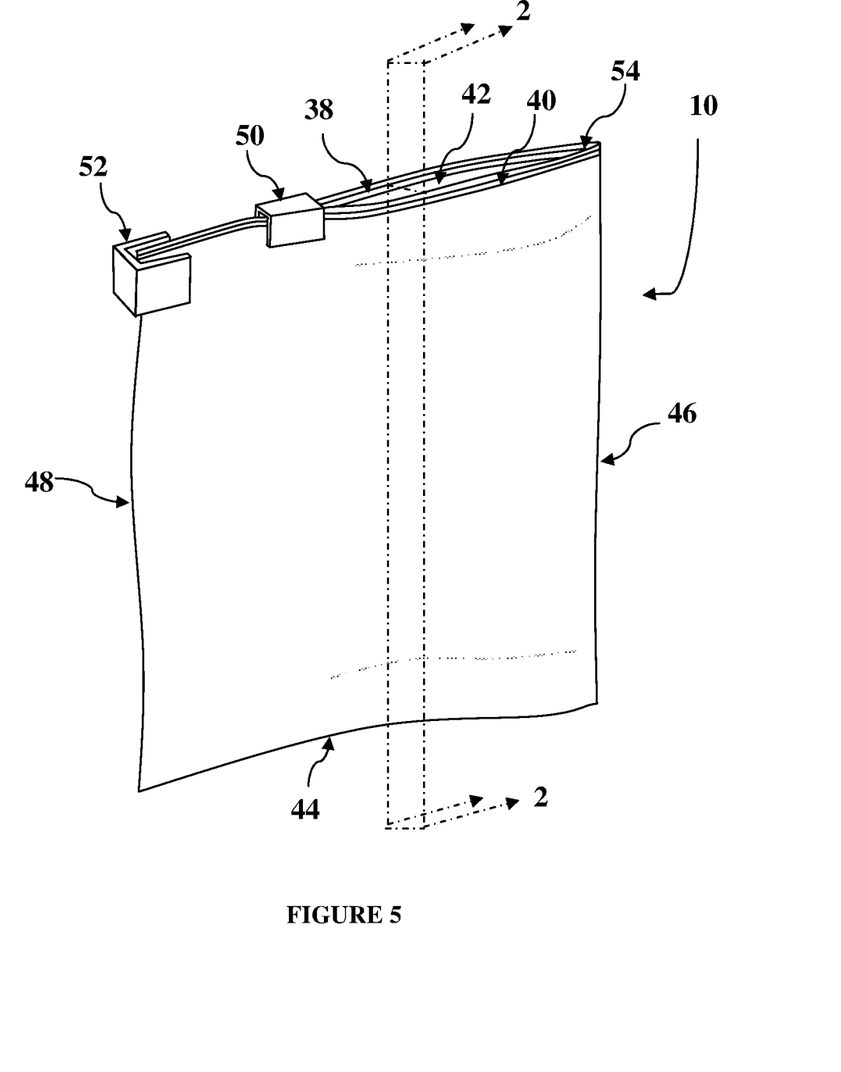
FIG. 5 illustrates a perspective view of an anti-counterfeit zipper-type environment-friendly reclosable packaging system constructed in accordance with yet another embodiment of the present disclosure.
Figure 6:
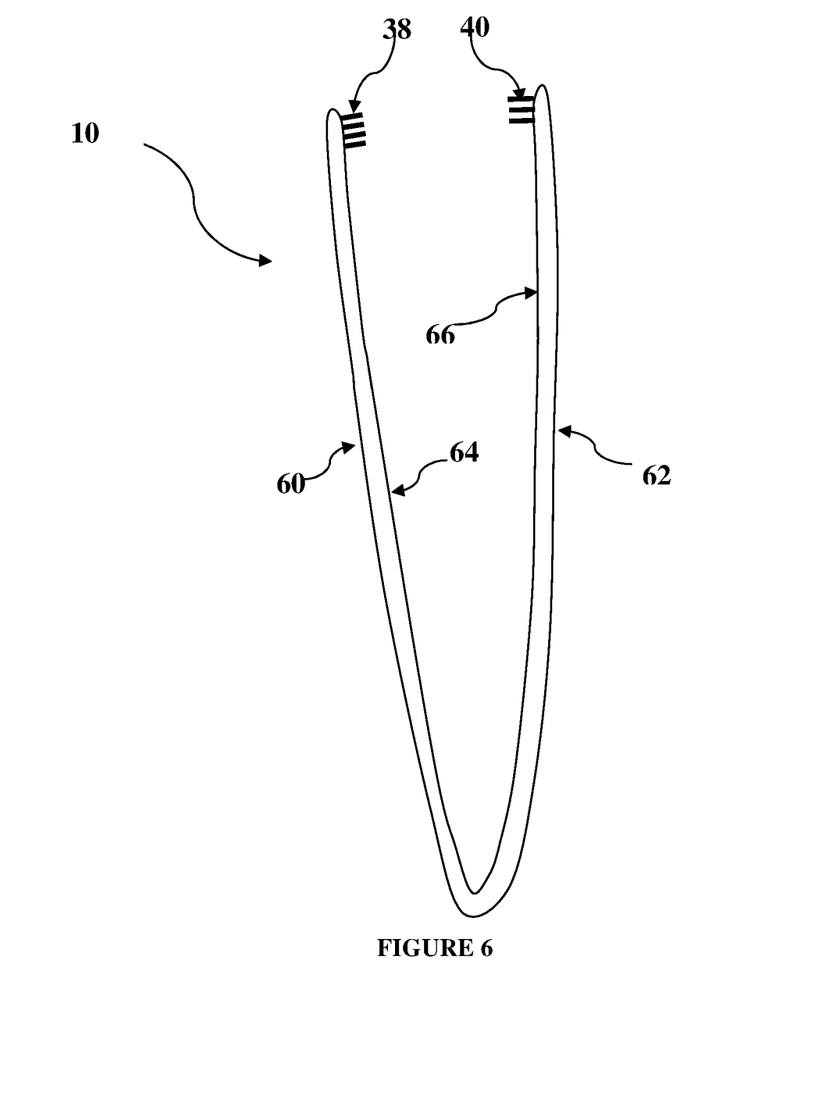
FIG. 6 illustrates a sectional view of the anti-counterfeit zipper-type environment-friendly reclosable packaging system of FIG. 5 taken along plane 2-2 of FIG. 5, with the closure in an open condition.

In yet another embodiment, the closure element (54) comprises a male member strip (40) secured on the operative top edge of the second wall (62) on its operative inner surface (66); a female member strip (38) secured on the operative top edge of the first wall (60) on its operative inner surface (64); a slider element (50) configured at the operative top edge (42) of the package (10) and configured to slide along the male member (40) and female member (38) simultaneously, thereby closing the mouth of said containment of the operative top edges (42) and a slider housing (52) affixed at the top of the operative left edge (48) of the said packaging system (10) and configured to define an internal cavity to receive said slider element (50).

The shape of the walls of package (10) is selected from the group consisting of rectangular, circular, elliptical, cylindrical, trapezoidal or polygonal.

BRIEF DESCRIPTION OF THE ACCOMPANYING DRAWING

The present disclosure will now be described with the help of the accompanying drawing, in which.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on," "engaged to," "connected to," or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "inner," "outer," "beneath," "below," "lower," "above," "upper," and the like, may be used in the present disclosure to describe relationships between different elements as depicted from the figures.

In one aspect, the present disclosure provides an anti-counterfeit environment-friendly packaging material that is both biodegradable and compostable, for use in the packaging of tobacco based products, and pharmaceutical and food products. The package of the present disclosure has anti-counterfeit features.

The anti-counterfeit environment-friendly packaging material of the present disclosure comprises an environment-friendly multilayer polymeric composite; and at least one iridescent non-metallic holographic stereogram in or on at least one layer of said environment-friendly multilayer polymeric composite, wherein the holographic stereogram is prepositional.

In accordance with the present disclosure, the holographic stereogram comprises one or more iridescent patterns selected from the group consisting of images, geometrical shapes, non-geometrical shapes and the like.

In accordance with one embodiment of the present disclosure, the holographic stereogram comprises at least one 1D image and at least one 2D image or at least one 3D image superimposed over each other.

In accordance with another embodiment of the present disclosure, the holographic stereogram comprises at least one 1D image, at least one 2D image and at least one 3D image superimposed over each other.

In accordance with the present disclosure, the environment-friendly multilayer polymeric composite comprises a biodegradable and compostable multilayer first substrate; a second substrate comprising at least one layer selected from a metal layer and a paper layer and optionally a third substrate comprising protective coating layer.

In accordance with the embodiments of the present disclosure, the polymeric composite comprises a multilayer polymeric film having thickness in the range of 15 µm to 25 µm; an aluminium metal layer having thickness in the range of 5 µm to 30 µm; a coated paper layer having thickness in the range of 30 gsm to 90 gsm; and a protective coating layer.

In second aspect, the present disclosure provides a process for preparing anti-counterfeit environment-friendly packaging material. The process comprises following steps.

Initially, the polymeric composite is coated with a primer to obtain primered polymeric composite. The primered polymeric composite is optionally subjected to corona treatment.

In accordance with the present disclosure, the polymeric composite is coated with a primer to enable the stable and consistent adhesion of the UV base coat.

Pre-positioned UV base coat is then applied on to the primered polymeric composite, followed by curing to obtain UV base coated polymeric composite.

In accordance with the present disclosure the composition of the UV Base coat is designed and customized to become compatible to the holographic stereogram design to be transferred on the UV base coated surface of the polymeric composite. The Equipment is fitted with the design specific anilox roller having defined cell volume holding capacity in each pore. The defined cell volume in BCM-Billions cubic microns, enables the accurate and controlled dosing of UV base coat on the primered surface of the polymeric composite. Sleeves are mounted on the opposite side of anilox roller. A custom built polymeric plate, which is corresponding to negative of the holographic stereogram design, is mounted on the sleeve.

The so obtained UV base coated polymeric composite is contacted with transfer film having iridescent non-metallic pre-created holographic stereogram to obtain anti-counterfeit environment-friendly packaging material; wherein the iridescent non-metallic holographic stereogram is applied at pre-positioned locations.

The present disclosure further provides a package (10) comprising:
  i. a first wall (128, 28, 60) and a second wall (130, 30 62), wherein said first wall (128, 28, 60) and said second wall (130, 30 62) are partially joined to each other along their edges to define an inner space within said walls and provide an opening along the edge defining a mouth for introducing or removing material into and from said inner space; and
  ii. a closure element (120, 20, 54);
wherein, at least one of the walls comprises a flexible multilayer polymeric film; and at least one iridescent holographic image in or on at least one layer of the flexible multilayer polymeric film.

The many possible designs of the package (10) of the present disclosure are described in detail herein below.

One exemplary embodiment is illustrated by FIGS. 1 and 2 of the present disclosure.

Referring to FIGS. 1 and 2 of the present disclosure, the anti-counterfeit environment-friendly package 10 includes intermeshing type closure. The package 10 has a first side 128 and a second side 130, each formed out of at least one of the aforementioned six blends, typically, in the form of flexible polymeric films with anti-counterfeit features.

The first wall (128) and the second wall (130) are partially joined to each other along their edges to define an inner space within said walls and provide an opening along the edge defining a mouth for introducing or removing material into and from said inner space.

The edges are secured by at least one method selected from the group consisting of heat sealing, sonic welding, and radio frequency welding.

The closure element 120 comprises a first member strip 126 attached in proximity to the operative top edge of the second wall 130 on its operative inner surface 134 and a second member strip 124 secured in proximity to the operative top edge of the first wall 128 on its operative inner surface 132. The first member strip 126 and the second member strip 124 are, substantially, of the same configuration and are juxtaposed to enable interlocking with each other.

In an embodiment, the first and the second member strips comprise a plurality of interlocking structures 122 as shown in FIG. 1. Each interlocking structure comprises a plurality of inverted anchor type elements uprightly disposed on the operative inner surface 134 and the operative inner surface 132, connected to each other via a plurality of bridges. The plurality of interlocking structures with a predetermined spacing there between, extend from the operative inner surface 134 and the operative inner surface 132 and are configured to achieve intermeshing between the interlocking structures and thus achieve closure of the package 10. The intermeshing type of closure can be interlocked by manually pressing across the first and the second member strips on the operative outside of the first wall 128 and the second wall 130, thereby sealing the package 10.

The number of interlocking structures in the member strips can vary from 1 to 50, depending upon the size of the environment-friendly packaging system and the degree of sealability required. A higher number of interlocking structures are also envisaged.

The intermeshing type closures are so configured as to achieve only a partial opening of the packaging system. In an embodiment, such a type of packaging system with a partial opening is suitable for the packaging of tobacco based products. This provision enables a limited amount of the contents to be accessed and avoids excess spilling of the contents. This enables pour and locking way of accessing the contents of the packaging system and closing the packaging system after accessing the contents.

Another exemplary embodiment is illustrated by FIGS. 3 and 4 of the present disclosure.

Referring to FIGS. 3 and 4 of the present disclosure, the anti-counterfeit environment-friendly package 10 includes male-female type closure system. The package 10 has a first wall 28 and a second wall 30, each formed out of at least one of the six blends, typically, in the form of flexible polymeric films with anti-counterfeit features.

The first wall (28) and the second wall (30) are partially joined to each other along their edges to define an inner space within said walls and provide an opening along the edge defining a mouth for introducing or removing material into and from said inner space.

The edges are secured by at least one method selected from the group consisting of heat sealing, sonic welding, and radio frequency welding.

A male-female type closure element 20 comprises a male member strip 26 secured on the operative top edge of the second wall 30 on its operative inner surface 34 and a female member strip 24 secured on the operative top edge of the first wall 28 on its operative inner surface 32.

The male member strip 26 is secured on the operative inner surface 34 and the female member strip 24 on the operative inner surface 32 by at least one method selected from the group consisting of heat sealing, sonic welding, and radio frequency welding.

In one embodiment, the male member strip comprises at least one rib while the female member strip comprises at least one groove. The rib and groove arrangement can be interlocked by manually pressing and pulling across the male and female strip members on the operative outside of the first wall 28 and the second wall 30 at the same time, thereby sealing the package 10.

In order to remove the excess air from inside the inner space, a small aperture 22 can be provided. FIG. 4 of the present disclosure provides the sectional view of the aperture 22. The excess air can be forced out of the inner space by pressing the first wall 28 and the second wall 30 after the interlocking of the male and the female closure members.

Still another exemplary embodiment is illustrated by FIGS. 5 and 6 of the present disclosure.

Referring to FIGS. 5 and 6 of the present disclosure, the anti-counterfeit environment-friendly package 10 includes male-female type closure system. The package 10 has a first wall 60 and a second wall 62, each formed out of at least one of the six blends, typically, in the form of flexible polymeric films with anti-counterfeit features.

The first wall (60) and the second wall (62) are partially joined to each other along their edges to define an inner space within said walls and provide an opening along the edge defining a mouth for introducing or removing material into and from said inner space.

The edges are secured by at least one method selected from the group consisting of heat sealing, sonic welding, and radio frequency welding.

A closure element 54 comprising a male member strip 40 secured on the operative top edge of the second wall 62 on its operative inner surface 66 and a female member strip 38 secured on the operative top edge of the first wall 60 on its operative inner surface 64 is provided. The male member strip 40 and the female member strip 38 are juxtaposed so as to enable interlocking with each other.

A slider element 50 is configured at the top of the package 10 to slide along the male member 40 and female member 38 simultaneously and facilitate their interlocking and reopening. A slider housing 52 is affixed at one end of the top of operative edges 48, and 46 of the package 10 and is adapted to define an internal cavity to receive the slider element 50 as it slides towards the slider housing 52. As the slider element 50 slides towards the slider housing 52, the interlocking of the male member 40 and the female member 38 and thus, the sealing of the package 10 is achieved and as the slider element 50 slides away from the slider housing 52, the separation of the male member 40 and the female member 38 and thus, the opening of the package 10 is achieved. The closure 54 by means of the slider element 50 can achieve multiple resealing and opening actions.

The types of closures in the present disclosure are only exemplary and not to be construed as a limitation. Other types of closures can be envisaged, non-limiting examples of which include, adhesives, invertible folds, buttons, clips, hook and loop fasteners, magnetic snaps, and the like. In another embodiment, a self-adhering resin can be used as the closure mechanism.

The anti-counterfeit environment-friendly packaging system of the present disclosure is a flexible or a rigid container such as bags, pouches, tubes, cartons, collapsible containers, and the like.

The anti-counterfeit environment-friendly package of the present disclosure can be manufactured in all possible sizes. The packaging system can be designed to carry contents of up to 100 kg.

The anti-counterfeit environment-friendly package of the present disclosure can be suitably configured to be in the form of a child-resistant packaging. The closures can be so designed that it cannot be opened by a child to access or spill the contents of the container.

In accordance with the present disclosure, after the disposal of the anti-counterfeit environment-friendly package, the metal layer and/or the paper layer is conveniently separated from the polymeric film and recycled. The polymeric film is made of the biodegradable and compostable resin material and the biodegradable and compostable closure, which is subject to composting, thus, being totally environment-friendly. The composting of the films and the closures are achieved in about 90 days.

The packaging systems of the present disclosure are environment-friendly and suitable to contain tobacco products and food products and pharmaceutical products.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Example 1: Preparation of Environment-Friendly Multilayer Polymeric Composite Three biodegradable and compostable multilayer first substrates, having width of 955 mm and a thickness of 20, 25 and 30 micron respectively were prepared.

Blends comprising polylactic acid and a copolyester of 1,4-butanediol, adipic acid, and terephthalic acid were used as resin material. For the melt mixing of these blends, an inner layer extruder, an outer layer extruder, and a core layer extruder were employed. In the core layer extruder, a first blend was melt mixed at a temperature of 187° C. to obtain a first melt. In the outer layer extruder, blends were melt mixed at a temperature of 197° C. to obtain a second melt. In the inner layer extruder, blend along with erucamide as slip additive were melt mixed at a temperature of 197° C. to obtain a third melt. The first, the second, and the third melts were extruded separately to obtain a core layer extrudate, an outer layer extrudate, and an inner layer extrudate respectively. These extrudates were then passed through a co-extrusion stack type die head in such a way that the core layer extrudate was laid over the inner layer extrudate to result in the multilayer film extrudate with the third melt comprising the slip additive forming the inner layer and the second melt forming the outer layer. The first melt forms the core layer of the multilayer film extrudate.

This multilayer film extrudate was then cooled at a temperature of 25° C. to obtain a biodegradable and compostable multilayer first substrate.

The second substrate comprising metal and/or metallized layer or paper and/or pre-treated paper layer was laminated on an outer layer of a first substrate prepared in experiment 1, by solvent less lamination method at a speed in the range of 175 to 200 mtrs/min, at a pressure of 5 bar and at a viscosity of 18 sec to obtain environment-friendly multilayer polymeric composite of the present disclosure.

The details of the so obtained polymeric composites 1-3 are tabulated in Table 1 given below.

TABLE 1

| Ex. No. | First substrate | Second substrate | Thickness of first substrate | Thickness of second substrate | Lamination machine speed M/min | Lamination method | Remarks |
|---|---|---|---|---|---|---|---|
| 1 | Multilayer polymeric film | Coated paper layer/aluminium layer | 20 (μm) | 65 (gsm)/ 9 (μm) | 200 | solvent-less | Stable composite |
| 2 | Multilayer polymeric film | Coated paper layer/aluminium layer | 25 (μm) | 65 (gsm)/ 9 (μm) | 200 | solvent-less | Stable composite |
| 3 | Multilayer polymeric film | Coated paper layer/aluminium layer | 30 (μm) | 65 (gsm)/ 9 (μm) | 200 | solvent-less | Stable composite |

Example 2: Preparation of Anti-Counterfeit Environment-Friendly Packaging Material in Accordance with the Present Disclosure Initially, the outer layer of the polymeric composite was coated with a primer comprising polymeric acrylic emulsion to obtain primered polymeric composite. UV base coat comprising a polymerisable dispersion containing mixture of acrylates and photo-initiators was then applied to the primered polymeric composite, and passed through the curing system with curing current in the range of 20 amp to 30 amp to obtain UV base coated polymeric composite. UV base coated polymeric composite was then passed through rollers in order to contact with the transfer film comprising modified polypropylene having iridescent non-metallic pre-created holographic stereogram to obtain anti-counterfeit environment-friendly packaging material.

The details of the packaging materials are tabulated in Table 2 given below.

TABLE 2

| Ex. No. | Polymeric composite | Curing current amp | Cell volume billions cubic microns (BCM) | Background | Remarks |
|---|---|---|---|---|---|
| 4 | prepared in ex 1 | 27.9 | 7 | Printed color patch | Consistent appearance of holographic stereogram |
| 5 | prepared in ex 2 | 27.1 | 7 | Printed color patch | Consistent appearance of holographic stereogram |

TABLE 2-continued

| Ex. No. | Polymeric composite | Curing current amp | Cell volume billions cubic microns (BCM) | Background | Remarks |
|---|---|---|---|---|---|
| 6 | prepared in ex 3 | 28.1 | 7 | Printed color patch | Consistent appearance of holographic stereogram |
| 7 | prepared in ex 1 | 28.1 | 7 | Buff background | Faint appearance of holographic stereogram |
| 8 | prepared in ex 1 | 28.1 | 11 | Buff background | No improvement in appearance of holographic stereogram |

From experiments 4-6 of table 2, it is evident that there is no impact of the change in the thickness of the multilayer polymeric film on the holographic stereogram effect.

Further, from experiments 4-8, it is evident appearance of the holographic stereogram is better on the dark background (ex no. 4-6) as compared to the buff background (ex. no. 7-8)

Example 3: Stability Study of the Anti-Counterfeit Environment-Friendly Packaging Material in Accordance with the Present Disclosure The anti-counterfeit environment-friendly packaging materials were subjected to scuff resistant tests. Scuff resistant tests are the industry standards for evaluating scuff or rub resistance of printed or coated surfaces, paper, paperboard, films, and printed materials.

The results are tabulated in table 3 below.

TABLE 3

Results of the scuff resistant tests

| Ex. No. | Test | | Anti-counterfeit environment-friendly packaging material | | |
|---|---|---|---|---|---|
| | | | Ex. 4 | Ex. 5 | Ex. 6 |
| 9 | Scuff resistance at higher temperature (50 revolutions) | At 40° C. for 5 min | Comparable to parent sample | Comparable to parent sample | Comparable to parent sample |
| | | At 45° C. for 5 min | Comparable to parent sample | Comparable to parent sample | Comparable to parent sample |
| | | At 50° C. for 5 min | Comparable to parent sample | Comparable to parent sample | Comparable to parent sample |
| 10 | Scuff resistance after exposure to moisture (50 revolutions) | Wet scrub for 1 min | Comparable to parent sample | Comparable to parent sample | Comparable to parent sample |
| | | Wet scrub for 2 min | Paper gets partly damaged | Paper gets partly damaged | Paper gets partly damaged |
| 11 | Scuff resistance at higher temperature and moisture (50 revolutions) | 40° C. and wet scrub for 1 min | Comparable to parent sample | Comparable to parent sample | Comparable to parent sample |
| | | 45° C. and wet scrub for 1 min | Comparable to parent sample | Comparable to parent sample | Comparable to parent sample |
| 12 | Solvent resistance | Wiping with ethyl acetate | Polymeric composite damaged | Polymeric composite damaged | Polymeric composite damaged |
| 13 | Scuff resistance for long duration | 100 revolutions | Comparable to parent sample | Comparable to parent sample | Comparable to parent sample |
| | | 150 revolutions | Comparable to parent sample | Comparable to parent sample | Comparable to parent sample |
| | | 200 revolutions | Comparable to parent sample | Comparable to parent sample | Comparable to parent sample |
| | | 250 revolutions | Comparable to parent sample | Comparable to parent sample | Comparable to parent sample |
| | | 300 revolutions | Comparable to parent sample | Comparable to parent sample | Comparable to parent sample |

From table 3, it is evident that the holographic stereogram of the present application is stable against stringent conditions, except organic solvents and therefore can be used as effective anti-counterfeit feature for the environment-friendly packaging material.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of an anti-counterfeit environment-friendly packaging system that:

is of food and pharmaceutical grade and non-reactive with the contents of the package;

has excellent anti-counterfeit features;

environment-friendly packaging; and can be made in the form of bags, pouches, tubes, cartons, collapsible containers, and the like.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An anti-counterfeit environment-friendly packaging material comprising:
   (a) an environment-friendly multilayer polymeric composite; and
   (b) at least one iridescent non-metallic holographic stereogram in or on at least one layer of said environment-friendly multilayer polymeric composite;
   wherein said environment-friendly multilayer polymeric composite comprising:
      a biodegradable and compostable multilayer first substrate comprising an inner layer, an outer layer and a core layer disposed between said inner layer and said outer layer;
      wherein said inner layer, said outer layer and said core layer independently comprises a blend of polylactic acid and a copolyester of 1, 4-butanediol, adipic acid, and terephthalic acid; and
      a second substrate comprising at least one layer selected from metal and/or metallized layer and a paper and/or pretreated paper layer;
   wherein said at least one iridescent non-metallic holographic stereogram is at pre-positioned location; and
   said at least one iridescent non-metallic holographic stereogram comprises at least one 1D image and at least one 2D image or at least one 3D image superimposed over each other.

2. The packaging material as claimed in claim 1, wherein said at least one iridescent non-metallic holographic stereogram comprises one or more iridescent patterns selected from the group consisting of images, geometrical shapes, and non-geometrical shapes.

3. The packaging material as claimed in claim 1, wherein said at least one iridescent non-metallic holographic stereogram comprises at least one 1D image, at least one 2D image and at least one 3D image superimposed over each other.

4. A process for preparing the anti-counterfeit environment-friendly packaging material as claimed in claim 1, wherein said process comprises:
   a) coating said environment-friendly multilayer polymeric composite with a primer to obtain a primered polymeric composite;
   b) applying a pre-positioned UV base coat on to said primered polymeric composite, followed by curing to obtain a UV base coated polymeric composite;
   c) contacting said UV base coated polymeric composite with a transfer film having a pre-created said at least one iridescent non-metallic holographic stereogram to obtain the anti-counterfeit environment-friendly packaging material;
      wherein said precreated said at least one iridescent non-metallic holographic stereogram is applied at said pre-positioned locations.

5. The process as claimed in claim 4, wherein process step (a) comprises corona treating said primered polymeric composite.

6. A package comprising:
   (i) a first wall and a second wall, wherein said first wall and said second wall are partially joined to each other along edges, having at least two ends, to define an inner space within said walls and provide an opening along a top edge defining a mouth for introducing or removing material into and from said inner space; and
   (ii) a closure element;

wherein, at least one of said walls comprises:
(a) an environment-friendly polymeric composite; and
(b) at least one iridescent non-metallic holographic stereogram in or on at least one layer of said environment-friendly polymeric composite;
wherein said environment-friendly multilayer polymeric composite comprising:
a biodegradable and compostable multilayer first substrate comprising an inner layer, an outer layer and a core layer disposed between the inner layer and the outer layer;
wherein said inner layer, the outer layer and the core layer independently comprises at least one blend of polylactic acid and a copolyester of 1, 4-butanediol, adipic acid, and terephthalic acid; and
a second substrate comprising at least one layer selected from metal and/or metallized layer and a paper and/or pretreated paper layer;
wherein said at least one iridescent non-metallic holographic stereogram is at pre-positioned location; and
said at least one iridescent non-metallic holographic stereogram comprises at least one 1D image and at least one 2D image or at least one 3D image superimposed over each other.

7. The package as claimed in claim 6, wherein the closure element comprises
(i) a first member strip attached in proximity to the operative top edge of said second wall on an operative inner surface of said second wall and
(ii) a second member strip secured in proximity to the operative top edge of said first wall on an operative inner surface of said first wall,
wherein said first member strip and said second member strip comprise a plurality of interlocking structures;
wherein each interlocking structure comprises a plurality of inverted anchor type elements uprightly disposed on said first member strip and said second member strip and connected to each other via a plurality of bridges.

8. The package as claimed in claim 6, wherein the closure element comprises
a male member strip comprising at least one rib secured on the operative top edge of the second wall on an operative inner surface of said second wall; and
a female member strip comprising at least one groove secured on the operative top edge of the first wall on an operative inner surface of said first wall.

9. The package as claimed in claim 6, wherein said closure element comprises
a male member strip secured on the operative top edge of the second wall on an operative inner surface;
a female member strip secured on the operative top edge of the first wall on an operative inner surface;
a slider element configured at the operative top edge of the package and configured to slide along the male member and female member simultaneously, thereby closing the mouth of said package of the operative top edges; and
a slider housing affixed at the one end of top of operative edges of the said packaging system and configured to define an internal cavity to receive said slider element.

10. The package as claimed in claim 6, wherein the shape of said walls is selected from the group consisting of rectangular, circular, elliptical, cylindrical, trapezoidal or polygonal.

11. The package as claimed in claim 7, wherein the shape of said walls is selected from the group consisting of rectangular, circular, elliptical, cylindrical, trapezoidal or polygonal.

12. The package as claimed in claim 8, wherein the shape of said walls is selected from the group consisting of rectangular, circular, elliptical, cylindrical, trapezoidal or polygonal.

13. The package as claimed in claim 9, wherein the shape of said walls is selected from the group consisting of rectangular, circular, elliptical, cylindrical, trapezoidal or polygonal.

* * * * *